United States Patent [19]

Svendsen

[11] Patent Number: 5,518,180
[45] Date of Patent: May 21, 1996

[54] ROTARY ATOMIZER AND A METHOD OF OPERATING IT

[75] Inventor: Gunnar Svendsen, Vejby, Denmark

[73] Assignee: Niro Holding A/S, Copenhagen, Denmark

[21] Appl. No.: 347,477

[22] PCT Filed: Jun. 3, 1992

[86] PCT No.: PCT/DK93/00192

§ 371 Date: Dec. 6, 1994

§ 102(e) Date: Dec. 6, 1994

[87] PCT Pub. No.: WO93/25316

PCT Pub. Date: Dec. 23, 1993

[30] Foreign Application Priority Data

Jun. 12, 1992 [DK] Denmark ................................ 0787/92

[51] Int. Cl.$^6$ ............................................. B05B 3/10
[52] U.S. Cl. ............................................. 239/224
[58] Field of Search ......................... 239/223, 224

[56] References Cited

U.S. PATENT DOCUMENTS

| | | | |
|---|---|---|---|
| 3,749,315 | 7/1973 | Crathern | 239/224 |
| 4,275,838 | 6/1981 | Fangmeyer. | |
| 4,368,849 | 6/1983 | Farmery | 239/224 X |
| 4,450,785 | 5/1984 | Meisner | 239/700 |
| 4,609,148 | 9/1986 | Gill | 239/224 |
| 4,713,146 | 12/1987 | Ek. | |

Primary Examiner—Kevin P. Weldon
Attorney, Agent, or Firm—Sughrue, Mion, Zinn, Macpeak & Seas

[57] ABSTRACT

A rotary atomizer a disc- or wheel-shaped atomizing device is secured to one end of a shaft which is connected with the rotor of a high frequency synchronous electric motor. The motor is operated at a rotational speed substantially higher than the first critical speed of the shaft and atomizing device. The shaft and the rotor of the high frequency motor are designed as one integral unit radially supported only by bearings at either end of a part of the shaft surrounded by the rotor.

7 Claims, 2 Drawing Sheets

ROTARY ATOMIZER AND A METHOD OF OPERATING IT

BACKGROUND OF THE INVENTION

1. Field of Invention

A rotary atomizer and a method of operating it.

The invention relates to a rotary atomizer of the kind in which a disc- or wheel-shaped atomizing device is secured to one end of a shaft which is connected with the rotor of a high frequency asynchronous electric motor. The operating speed of the motor is controlled by a frequency converter to impart to the shaft a rotational speed substantially higher than the first critical speed of the shaft and atomizing device.

2. Prior Art

Figure 1:
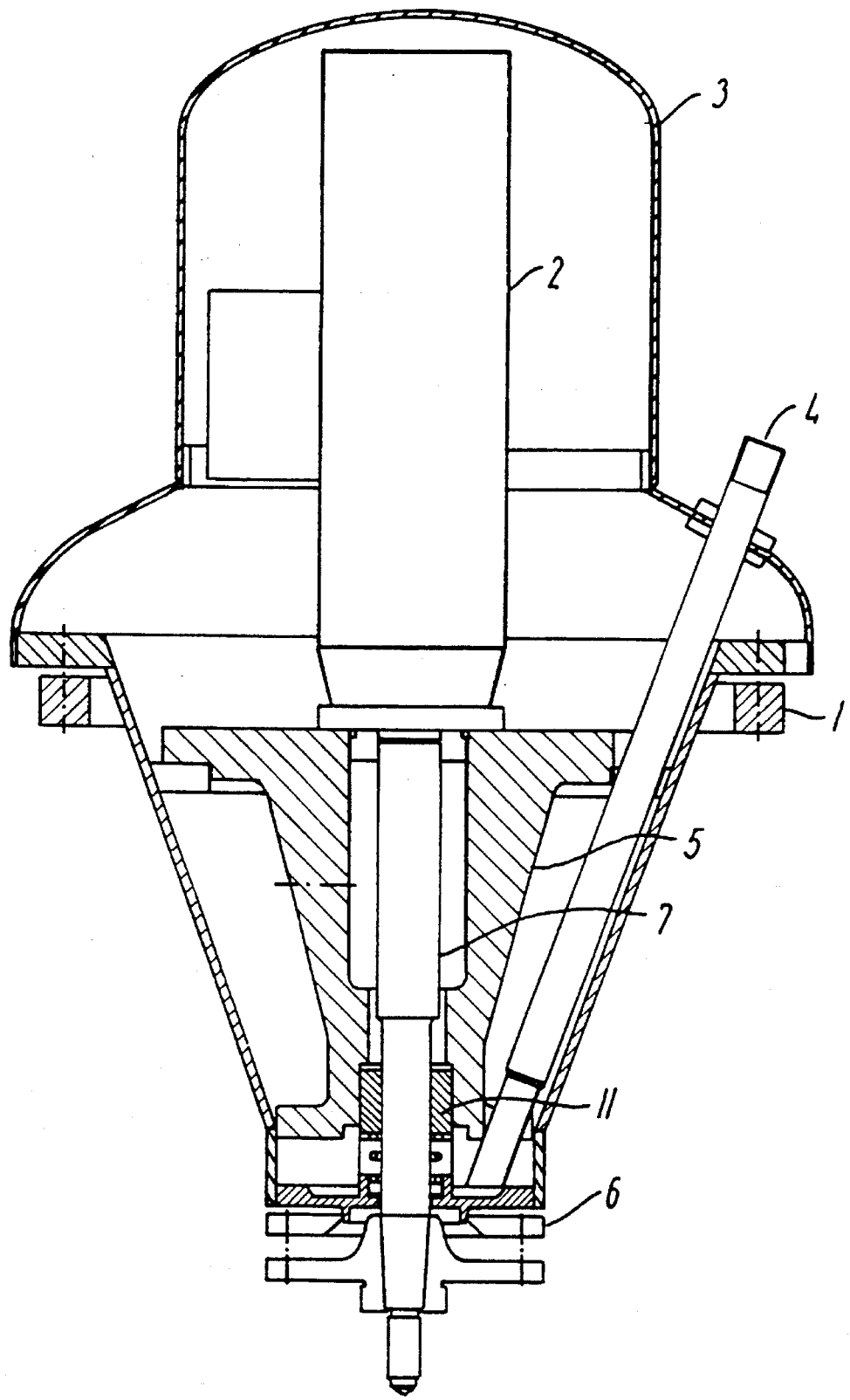
Figure 2:
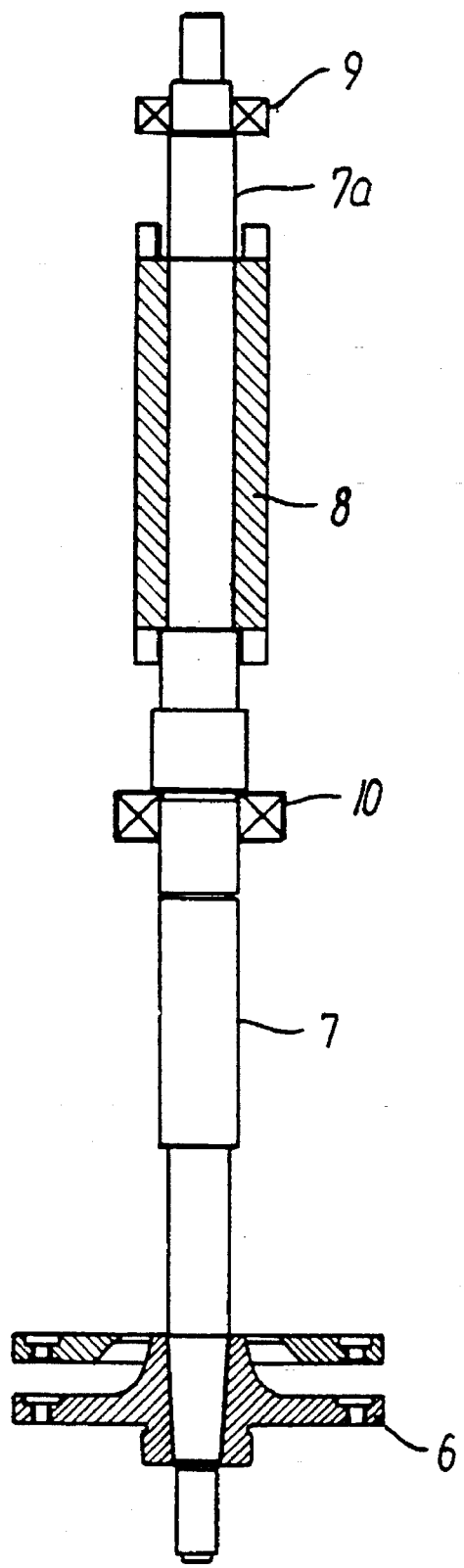

In general, rotary atomizers in which the atomizing disc or wheel is directly driven by a high speed electric motor is known, e.g. from Keith Masters: "Spray Drying Handbook", 5th Edition, New York 1991, page 218. These offer the advantage that a gear transmission between the drive motor and the atomizer is not required. In some prior art atomizers of this kind a comparatively short rigid shaft carrying the atomizing device at its lower end has been coupled with the rotor of the high frequency motor.

With such a design, the necessity to operate the atomizer within a speed range safely below the first critical speed of the shaft and the atomizer wheel sets limits to the diameter range of atomizer wheels, for which a direct high frequency motor drive can be successfully used when the circumferential velocity required for atomization is to be achieved.

From U.S. Pat. No. 4,713,146 it is known to operate rotary atomizers at rotational speeds higher than the first critical speed of the rotating parts by a rather complicated shaft design involving incorporation of spring means between inner and outer shaft members to permit flexible pivotal motions of the shaft during start and stop of the atomizer.

SUMMARY OF INVENTION

From this background, it is the object of the invention to provide a rotary atomizer of the kind described which to a much lesser extent suffers from the described limitations and may thus be successfully used for a far wider range of rotary atomizers down to small-scale atomizers with a power consumption of 1 kW and with a smaller wheel diameter down to, e.g. 90 mms or less and which provides flexibility of the shaft with a simple design of the rotary system.

According to the invention this object is achieved by a design characterized in that the shaft and the rotor are designed as one integral unit with the rotor surrounding a part of the shaft remote from said one end, said shaft and rotor unit being radially supported only by radial bearings at either end of said part of the shaft.

By operating the atomizer at the supercritical rotational speed the atomizing device will be self-aligning during operation, and the whole system will be less sensitive to dynamic imbalances caused by tolerances or imperfections in the atomizer wheel geometry and/or irregularities in the feeding of the product to be atomized.

The design of the shaft and the rotor of the high frequency motor as one integral unit offers the advantage of a very compact design which is particularly useful in small-size atomizers designed to handle feed volumes down to about 50 liters per hour. However, the invention is in no way limited to such applications but may successfully be put into operation for a substantial range of wheel diameters up to large size atomizer wheels having a diameter of 350 mms or more and designed for a product handling capacity of 200 tons per hour or more.

The invention furthermore relates to a method of operating a rotary atomizer of the kind in which a disc- or wheel-shaped atomizing device is secured to one end of a shaft which is directly connected with the rotor of a high frequency asynchronous electric motor, the operating speed of which is controlled by a frequency converter to impart to the shaft a rotational speed substantially higher than the first critical speed of the shaft and atomizing device.

According to the invention this method is characterized in that with the shaft and the rotor designed as an integral unit with the rotor surrounding a part of the shaft remote from the one end and with said shaft and rotor unit radially supported only by radial bearings at either end of said part of the shaft, said frequency converter is operated to control the motor to rotate the shaft at a speed within a range from 2 to 10 times the first critical speed.

In typical applications the operational speed will preferably be in a range of 2 to 10 times the first critical speed of the rotating parts, and dependent on the wheel size the operative speed range may be, e.g. from 15,000 to 30,000 rpm for smaller sizes and from 5,000 to 10,000 rpm for larger sizes.

Taking account of these operating conditions, the supporting shaft for the atomizing device must be a "soft" or "elastic" shaft dimensioned to provide together with the other rotating parts of the atomizer a first critical speed which will typically be in the range from 500 to 6,000 rpm and preferably within the range of 1,000 to 5,000 rpm.

BRIEF DESCRIPTION OF THE DRAWING

In the following, the invention will be further explained with reference to the accompanying drawings in which FIG. 1 is a sectional view of an embodiment of a rotary atomizer according to the invention; and FIG. 2 shows the drive shaft of the atomizer in FIG. 1 with an atomizer wheel mounted at its lower end and the rotor windings of the high frequency drive motor secured to the upper part of the shaft.

DESCRIPTION OF THE PREFERRED EMBODIMENTS

The illustrated embodiment of a rotary atomizer according to the invention is designed for installation in the upper part of a chamber such as a spray drying chamber and comprises a support bracket 1 for connection with a ceiling wall of the chamber.

The support bracket 1 supports the frame or casing 2 of a drive motor which is a high frequency asynchronous electric motor controlled by a frequency converter, not illustrated, as is well known in the art.

The motor casing 2 is covered by an external shield 3 which may protrude above the ceiling of the chamber, and through which a feed pipe 4 for the supply of the product, e.g. a liquid to be atomized, extends downwards through the lower atomizer casing 5 to terminate opposite the atomizing device which in the illustrated embodiment is an atomizer wheel 6 that may in itself be a conventional design.

The atomizer wheel 6 is secured at the lower end of a drive shaft 7 which in accordance with the invention is designed as an integral one-piece spindle extending substantially vertically upwards into the motor casing 2 where as shown in FIG. 2 the rotor winding 8 of the high frequency electric motor is secured directly to an upper part 7a of the shaft.

As illustrated, the shaft is designed as a comparatively slender solid spindle which is radially supported only by bearings 9 and 10 arranged on either side of the upper part 7a of the shaft in the motor casing 2 and of which the lower support bearing 10 also serves the axial support of the shaft 7.

With the relatively great free length 7b of the shaft extending downwards from the lower support bearing 10 towards the atomizer wheel 6 radial deflection of the rotating parts of the atomizer will be permitted when passing the first critical speed during start and stop of the atomizer.

In typical cases the shaft and the atomizing device are dimensioned to have a first critical speed within the range of 500 to 6,000 rpm, and preferably the rotating parts are dimensioned to have the first critical speed within the range of 1,000 to 5,000 rpm.

It is well known in the art to design and dimension parts of rotating systems to have specific critical speed values, e.g. by means of computer-aided engineering. Typically, the second critical speed of the rotating parts will be several orders higher than the first critical speed, e.g. more than ten times higher.

By control via the non-illustrated frequency converter, the electric drive motor is operated to impart a rotational speed to the shaft substantially higher than the first critical speed of the rotating parts.

As mentioned hereinbefore, a preferred speed range may be from 2 to 10 times the first critical speed of the rotating parts.

In order to limit the radial deflection of the rotating parts during start and stop of the atomizer, a guide bearing 11 having a radial clearance in respect of the shaft 7 may be arranged in the lower atomizer casing 5 relatively close above the atomizer wheel 6. The bearing 11 may, e.g. be a graphite bearing.

I claim:

1. A rotary atomizer comprising; a shaft, a disc-shaped atomizing device secured to one end of said shaft said shaft connected with a rotor of a high frequency asynchronous electric motor, the operating speed of said motor controlled by a frequency converter to impart to the shaft a rotational speed substantially higher than the first critical speed of the shaft and atomizing device wherein, the shaft and the rotor are one integral unit, with the rotor surrounding a part of the shaft remote from said one end, said shaft and rotor unit being radially supported only by radial bearings at either end of said part of the shaft.

2. A rotary atomizer as claimed in claim 1, characterized in that the operating speed is within a range from 2 to 10 times the first critical speed.

3. A rotary atomizer as claimed in claim 1, characterized in that the shaft and the atomizing device are dimensioned to have a first critical speed within the range of 500 to 6,000 rpm.

4. A rotary atomizer as claimed in claim 3, characterized in that the shaft and the atomizing device are dimensioned to have a first critical speed within the range of 1,000 to 5,000 rpm.

5. A rotary atomizer as claimed in claim 1, characterized in that the atomizing device (6) is designed so as to provide a peripheral speed within the range of 50 to 350 m/sec.

6. A rotary atomizer as claimed in claim 1, characterized in that an additional guide bearing (11) having a radial clearance in respect of the shaft (7) is arranged relatively close to the atomizing device (6) to limit the radial deflection of the shaft (7).

7. A method of operating a rotary atomizer having a disc- or wheel-shaped atomizing device secured to one end of a shaft which is directly connected with the rotor of a high frequency asynchronous electric motor, the operating speed of of said motor controlled by a frequency converter to impart to the shaft a rotational speed substantially higher than the first critical speed of the shaft and atomizing device comprising the steps of; the shaft and the rotor are united as an integral unit with the rotor surrounding a part of the shaft remote from said one end and with said shaft and rotor unit radially supported only by radial bearings at either end of said part of the shaft and, said frequency converter is operated to control the motor to rotate the shaft at a speed within a range from 2 to 10 times the first critical speed.

* * * * *

UNITED STATES PATENT AND TRADEMARK OFFICE
CERTIFICATE OF CORRECTION

PATENT NO.   : 5,518,180
DATED        : May 21, 1996
INVENTOR(S)  : Gunnar SVENDSEN It is certified that error appears in the above-identified patent and that said Letters Patent is hereby corrected as shown below:

On title page, item [22] change the PCT filing date to read as follows:
--June 3, 1993--

Signed and Sealed this

Thirty-first Day of December, 1996

Attest:

BRUCE LEHMAN

*Attesting Officer*          *Commissioner of Patents and Trademarks*